US008769207B2

(12) United States Patent
Jiao et al.

(10) Patent No.: US 8,769,207 B2
(45) Date of Patent: Jul. 1, 2014

(54) CACHING METHOD AND APPARATUS FOR A VERTEX SHADER AND GEOMETRY SHADER

(75) Inventors: Jeff Jiao, San Jose, CA (US); Timour Paltashev, Laveen, AZ (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 763 days.

(21) Appl. No.: 12/015,112

(22) Filed: Jan. 16, 2008

(65) Prior Publication Data

US 2009/0182948 A1 Jul. 16, 2009

(51) Int. Cl.
*G06F 12/08* (2006.01)

(52) U.S. Cl.
USPC .................................. 711/133; 711/E12.069

(58) Field of Classification Search
USPC .......................................................... 711/113
See application file for complete search history.

(56) References Cited

U.S. PATENT DOCUMENTS

| 6,260,114 B1 * | 7/2001 | Schug .......................... 711/129 |
| 6,886,085 B1 * | 4/2005 | Shuf et al. ..................... 711/159 |
| 7,149,883 B1 * | 12/2006 | Hammarlund et al. ....... 712/245 |
| 2007/0067607 A1 * | 3/2007 | Jiao et al. ...................... 712/215 |

* cited by examiner

*Primary Examiner* — Kenneth Lo
(74) *Attorney, Agent, or Firm* — McClure, Qualey & Rodack, LLP

(57) ABSTRACT

Systems and methods for sharing a physical cache among one or more clients in a stream data processing pipeline are described. One embodiment is directed to a system for sharing caches between two or more clients. The system comprises a physical cache memory having a memory portion accessed through a cache index. The system further comprises at least two virtual cache spaces mapping to the memory portion, each of the virtual cache spaces has an active window which has a different size than the memory portion. Further, the system comprises at least one virtual cache controller configured to perform a hit-miss test on the active window of the virtual cache space in response to a request from one of the clients for accessing the physical cache memory. Furthermore, data is accessed from the corresponding location of the memory portion when the hit-miss test of the cache index returns a hit.

19 Claims, 11 Drawing Sheets

CACHING METHOD AND APPARATUS FOR A VERTEX SHADER AND GEOMETRY SHADER

FIELD OF THE INVENTION

The present application relates generally to implementation of a programmable graphics pipeline in a GPU and more particularly to the use of a shared common vertex data cache for vertex shader and geometry shader programs executing in a pool of parallel processing units.

DESCRIPTION OF THE RELATED ART

The present art implements graphics pipelines using only a vertex shader (VS) and pixel shader (PS) programs assigned to separate processing units located in different stages of a GPU pipeline. As generally known, a vertex shader generally operates efficiently with a dedicated vertex cache because data can be provided as needed. No special sorting of the data for processing is required. Conventional vertex caches, however, have a number of drawbacks. Reference is made to FIG. 1, which shows a prior art arrangement of a vertex cache Read Request FIFI, a problem occurs when the hardware performs a hit test long before the data is updated in the cache and read by the next pipeline stage unit (e.g., the setup engine). For the post-VS vertex cache, the hit test is performed against vertex indices at the front of the VS. If there is a hit, the reference counter for the hit cache line is incremented, indicating that a read is pending for the line, and the line address is written into a pending cache read request FIFO error in FIG. 1 along with other primitive info.

When the data is read by the next pipeline stage unit, the reference counter is decremented, indicating that a read has completed. If there is a miss in the vertex cache, the cache control searches and replaces a line for the missed vertex. When the reference count for the line is equal to zero, the line is free to be replaced because all previous pending reads have been completed. However, when the reference count in all the lines is not equal to zero, the cache hit test and the subsequent line replacement is stalled. Since the VS execution may take a long time to complete, there is significant latency between the cache hit test and data read. When the cache size is small, the cache frequently stalls due to the long latency, blocking hit test. For example, if the VS latency is 200 cycles, the cache contains 32 lines, and there are an average of 2 hits after 1 miss on every line, then, after about 96 cycles, the cache stalls because every line has a pending read and the reference count is not zero. Increasing the cache size by increasing the number of lines is one possible solution. However, one perceived shortcoming is that the cost is high because more cache tags and comparators are needed. Furthermore, above a certain size, adding more cache lines with tags does not increase the cache hit rate significantly and cost remains an issue.

Other schemes are utilized for solving the cache size and latency compensation issue. For example, pre- and post-reference counters are used to allow multiple misses (reuse) on the same line at the hit test stage without waiting for all previous reads to finish at the bottom. However, this technique also has a number of perceived shortcomings. First, the vertex shader execution has to be performed in order, and the data must be updated in the cache in order. Second, when the actual data placement is tied to the tag at the front in a set-associative cache, the cache RAM is not fully utilized when the cache conflict is high (i.e., the requests are not evenly distributed into all sets and there are a lot of requests hit in one set).

Another perceived shortcoming with prior art vertex caches is that the size of the cache fixes the partitioning of the tag field and the index field is fixed. For example, with a four-set associative cache with each set having a given size, the size of the cache is set to (4 sets lines/set*bytes/line). It also sets the size of the tag to be stored in the tag RAM. If the size of the cache is increased by increasing the size of the sets, the sizes of the index and the tag fields must be adjusted.

The graphics pipeline shown in FIG. 2A compounds the problems described above. The new API Direct 3D 10.0 proposal from Microsoft describes a graphics pipeline that includes an Input Assembler, a Vertex Shader, a Geometry Shader (GS), a Rasterizer/Interpolator, a Pixel Shader (PS), and an Output Merger stage. The components in FIG. 2A are generally understood by those skilled in the art and need not be described.

FIG. 2B shows possible inputs and outputs of the Geometry Shader. Included are point and line lists, line and triangle lists, and triangle strips. The Input Assembler (IA) has the responsibility of taking the index and vertex streams and composing the actual geometric data that is fed into the VS and GS components. At a simplest level, this component takes the various primitive types (line list, triangle strip, etc.) and constructs the actual triangles (some primitive types share vertices). At a more complex level, it deals with geometry instancing and stream-out data. A useful feature is that it generates a set of counters as it walks through the geometry— vertex ID's and primitive ID's. These can be used further down the pipeline to vary processing (or source data) depending on the result.

The Vertex Shader stage processes vertices, performing operations such as transformations, skinning, and lighting. The Vertex Shader logically operates on a single input vertex and produces a single output vertex. The Geometry Shader, which is new unit added to prior art pipelines, allows the writing of code that operates on a per-primitive basis. Furthermore, it permits geometry to be added procedurally, effectively extending the hardware to a whole new class of algorithms. The Geometry Shader stage runs application-specific shader code with transformed, skinned and lit vertices as input and the ability to generate new vertices on the output. Unlike the Vertex Shader, which operates on a single vertex, the GS unit's inputs are the vertices for a full primitive (three vertices for a triangle, two vertices for a line, a single vertex for a point) and the vertex data for the edge-adjacent primitives (an additional three vertices for a triangle, an additional two vertices for a line), as shown in FIG. 2B. The GS stage is capable of outputting multiple vertices, forming a single selected topology such as point lists, line strips and triangle strips, as shown in FIG. 2B. The number of primitives that can be emitted can vary freely within any invocation of the GS, but the maximum must be declared statically. Strip lengths emitted from a GS invocation can be arbitrary.

One powerful feature connected to the GS is the Stream Output (STO). Conventionally, the graphics pipeline moves in one direction (i.e., data gets fed in by the application and, via a number of steps, generates an image on the screen). Locking render targets is approximate to being able to retrieve the outputs of a given stage. The stream output mechanism allows the GS to circulate its results back to the IA so that the results can be reprocessed. Although there is no requirement that the results circulate back, the results can circulate and render, thereby bypassing the output both to the rasterizer and the Input Assembler. The STO essentially provides for multi-pass geometry processing with minimal intervention by the CPU (which is good for parallelism). Examples of this include creating geometry in the first pass (Bezier patches and/or skinning) and then performing a shadow-volume extrusion on a second pass.

Referring back to the graphics pipeline shown in FIG. 2A, the output of the GS is sent to the Rasterizer stage and/or to a vertex buffer in memory (Stream Out). The Rasterizer stage performs clipping perspective divide and viewport/scissor selection and implementation. It also generates all pixels for GS output primitives and provides an early visibility test. The Pixel Shader operates on one pixel at a time. Inputs to the Pixel Shader include vertex attributes that can be chosen on a per-element basis to be interpolated with or without perspective correction or be treated as a constant per primitive. The Pixel Shader can receive inputs from the Input Assembler directly.

The Output Merger (OM) is a fixed function unit and is also generally the final stage in the pipeline. Its function is to take all of the results generated by the pipeline and merge them into the final pixel value that are seen on the screen. It uses the stencil values, depth values along with multiple render targets along with various blending functions, to create the final result. Accordingly, various units in the graphics pipeline shown in FIG. 2A (particularly the VS and GS units) would benefit from accessing a vertex cache. However, the VS and GS units generally behave very differently. As described above, the VS logically operates on a single input vertex and produces a single output vertex. The GS operates on a full primitive and the vertex data for the edge-adjacent primitives. The GS unit is capable of producing multiple vertices, forming a single selected topology such as point lists, line strips, and triangle strips. Consequently, the very different access patterns make the design of a vertex cache difficult. Generally, the size of the cache will be one size to meet the requirements of the VS and a very different size to meet the requirements of the GS. Therefore, a heretofore unaddressed need exists in the industry to address the aforementioned deficiencies and inadequacies.

BRIEF SUMMARY OF THE INVENTION

Briefly described, one embodiment, among others, is directed to a system for sharing caches between two or more clients. The system comprises a physical cache memory having a memory portion accessed through a cache index. The system further comprises at least two virtual cache spaces mapping to the memory portion and at least one virtual cache controller configured to perform a hit-miss test on the active window of the virtual cache space in response to a request from one of the clients for accessing the physical cache memory. In accordance with some embodiments, each of the virtual cache spaces has an active window which has a different size than the memory portion. Furthermore, data is accessed from the corresponding location of the memory portion when the hit-miss test of the cache index returns a hit.

Another embodiment is directed to method for accessing a physical cache by two or more clients. The method comprises mapping a memory portion of the physical cache to a plurality of entries of at least two virtual memory spaces corresponding to the clients respectively wherein the plurality of entries being controlled by a set of pointers. The method further comprises receiving a request for accessing a slot in the physical cache by one of the clients wherein the request contains a cache index associated with the slot in the physical cache, comparing the cache index to the plurality of entries of the corresponding virtual memory space within a range determined by the set of pointers, and accessing data from the slot in the physical cache if comparing the cache index returns a hit. In accordance with some embodiments, data from the slot in the physical cache is removed if a distance between the cache index and the set of pointers exceeds a threshold when comparing the cache index to the plurality of entries Yet another embodiment is directed to a graphic processing system comprising a physical cache having a plurality of slots for storing data, a cache controller configured to allocate memory space within the physical cache, and a plurality of clients configured to access data from the physical cache for further processing, wherein the cache controller comprises a status table associated with slots of the memory space, and wherein each of the plurality of clients has a corresponding memory space. In accordance with some embodiments, the cache controller is further configured to remove a slot from the physical cache based on a distance of the slot from being read by a next pipeline.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION OF THE INVENTION

Figure 1:
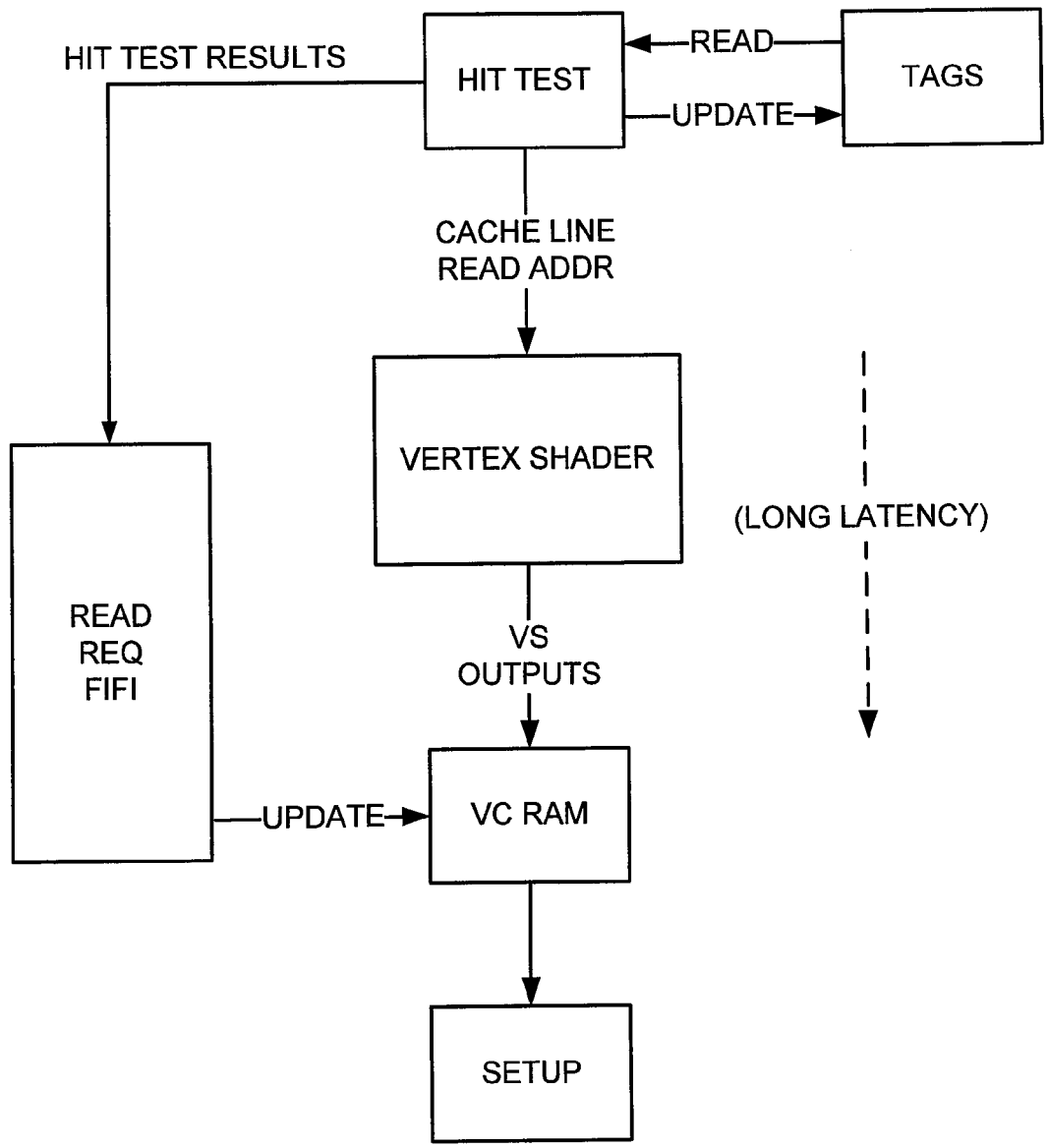
FIG. 1 shows a prior art arrangement of the vertex cache Read Request FIFI.
Figure 2A:
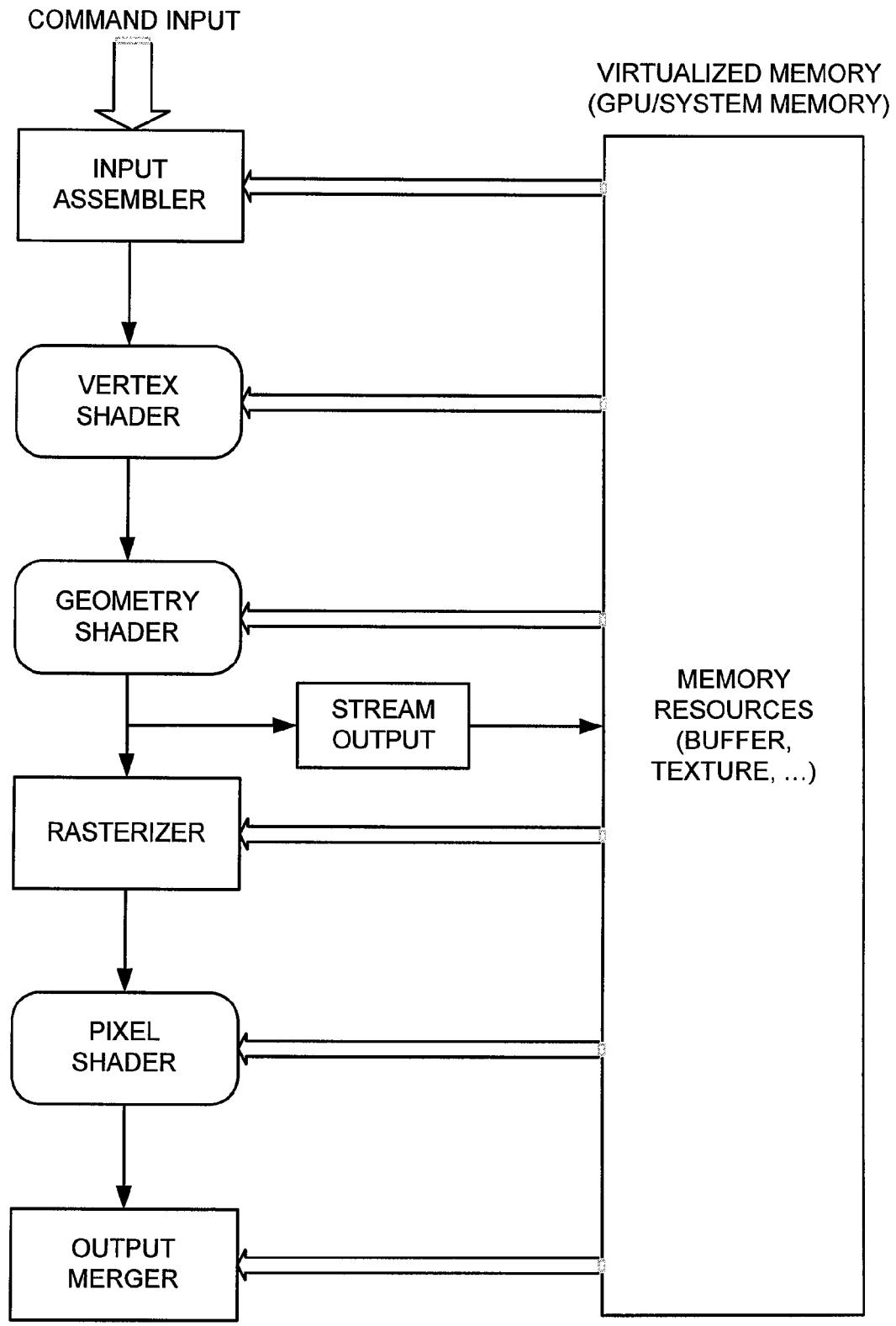
FIG. 2A depicts the API Direct 3D 10.0 proposal from Microsoft for a graphics pipeline.
Figure 2B:
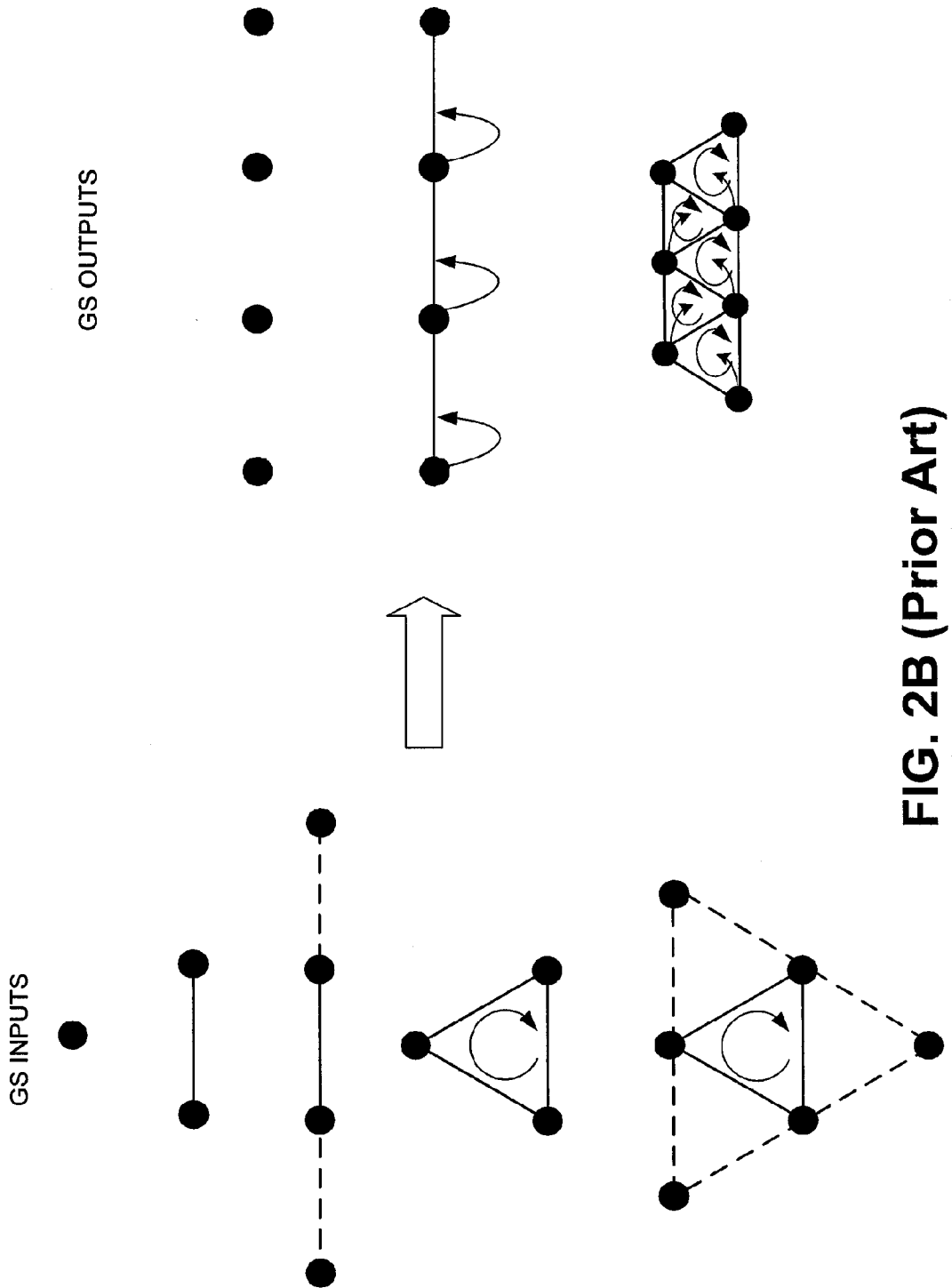
FIG. 2B shows the possible inputs and outputs of the Geometry Shader.

Various embodiments of the present invention address the perceived shortcomings of the prior art approaches described above and provide a cache design that minimizes the stalling that may occur due to the processing of hits and long latencies experienced by the VS unit. Embodiments described herein provide for flexible buffer sizes within the cache in order to meet the needs of the GS and the VS units while allowing both the GS and VS units to share the same cache.

Exemplary embodiments of the present invention described herein employ a pair of virtual caches that are separate from the physical cache controller. A set of virtual tags is decoupled from the physical tags of the physical cache.

The actual number of physical cache entries may be smaller or larger than the number of virtual tag entries (e.g., for one embodiment, it may be larger for higher hit rates in order to improve average latency). The result of a hit test on the virtual tag is an address in the physical cache. In accordance with one embodiment, the virtual cache space for the VS is larger than the number of virtual tag entries, and the virtual tag entries map to a continuous portion of the VS virtual cache space (a "moving window" of the VS virtual cache space). As a non-limiting example, suppose the virtual cache space has 256 entries and the VS moving window has 32 entries. The result is that up to 256 vertices are allowed in the pipeline. However, only 32 virtual tags (representing indices of up to 32 vertices) are kept for the virtual cache hit test to balance cost/performance trade-offs.

It should be noted that there are several advantages to using virtual tags. One advantage is that the number of virtual tag entries and cache entries may be set to different values in order to optimally serve different purposes. For the hit test (based on the performance/cost targets) the appropriate number of virtual tag entries can be chosen independently of the cache size. This also means that the cache is independent of the virtual tag size and cost. Another advantage is that the VS virtual cache space can be sized to improve the VS hit rate (which ultimately improves performance), separately from the physical cache VCL1 (Vertex Cache L1). The physical cache VCL1 is sized for the typical out-of-order range of the VS outputs and not for the VS hit rate, thereby greatly reducing the hardware cost. The VCL1 is backed up, in the memory hierarchy, by an L2 cache (shared by shader instructions, constants, spilled shader registers and spilled vertex cache content) and video memory.

The concepts described apply to the GS as well as to the VS. The VCL1 cache is not sized based on the GS hit rate, but based on the typical out-of-order range of GS outputs. Also, though the GS may claim to output up to certain size, say 32 vertices for each GS invocation, the real output may vary, say from 1 to 10. If 32 vertices were always reserved, expensive hardware would be wasted. This is another reason for using a virtual cache controller for the GS unit.

It should also be noted that in accordance with exemplary embodiments, the physical cache is shared between the VS and the GS. Generally, the physical cache is a resource that can be shared by any number of pipeline stages. It should also be noted that for various embodiments, a uniform cache address is utilized to access the cache so that the cache may be shared between all the different outputs/inputs in the various pipeline stages. This is logically similar to having many logical FIFOs or caches connecting the pipeline stages being mapped to the same physical buffer. Additionally, the data in the buffer can spill over to the L2 cache or further into memory.

The replacement scheme, based on "distance" to consumption, is another important aspect of various embodiments. When data between two pipeline stages contend for one slot in the buffer, the data closer to being read (i.e., consumed) by the next pipeline stage is granted higher priority. The data further from being read is written to the L2 cache and replaced. When the "distance" to consumption point is reduced to a minimum, the data can be brought back from the L2 cache. Finally, it should also be appreciated that the embodiments described herein may be utilized in various environments and applications, including multiprocessors (multi-shader cores), multi-threading applications, and out-of-order execution.

Figure 3A:
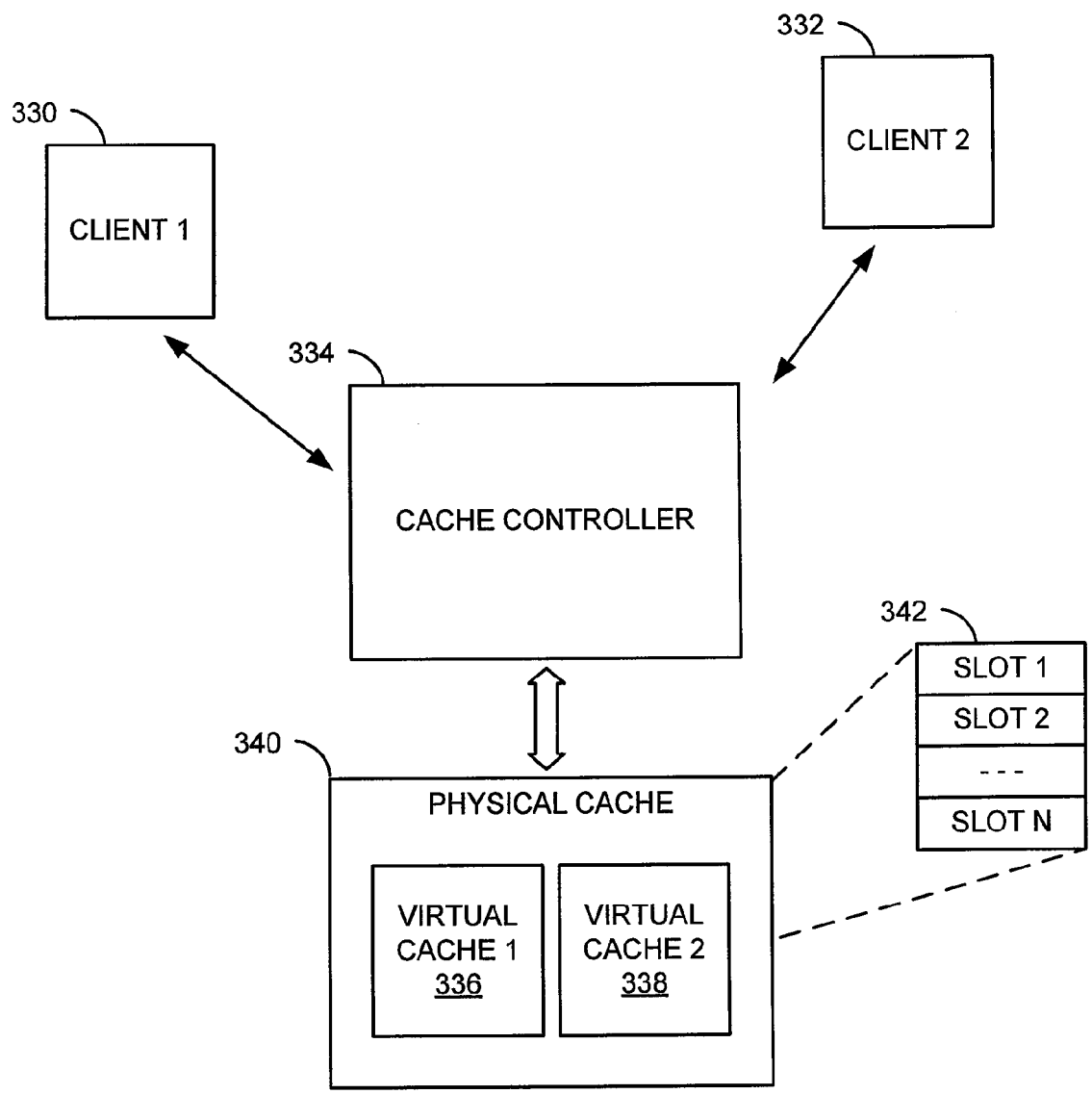
FIG. 3A shows a block diagram for an embodiment of a shared cache system for multiple clients.

Reference is now made to FIG. 3A, which is a block diagram for an embodiment of a shared cache system for multiple clients. FIG. 3A shows a plurality of clients 330, 332 sharing a common physical cache 340. For some embodiments, the clients 330, 332 may be a vertex shader and a geometry shader. Generally, the clients 330, 332 may have different cache access patterns. The physical cache 340 may be comprised of a plurality of slots or cache lines 342 used for storing data. The cache system may further include a cache controller 334 which functions as an interface between the plurality of clients 330, 332 and the physical cache 340. For some embodiments, the cache system may include a first virtual cache 336 that includes a first memory that maps a cache address of a slot allocated in the physical cache 340 to a flag indicating the allocation, and a first pair of pointers defining a range of physical cache addresses that are allocated for the first virtual cache 336 in the physical cache 340. The first virtual cache 336 permits accesses by one of the clients 330 (i.e., CLIENT 1) to slots in the physical cache 340 allocated to the first virtual cache 336.

The cache system may further comprise a second virtual cache 338 that includes a second memory that maps a cache address of a slot allocated in the physical cache 340 to a flag indicating the allocation, and a second pair of pointers defining a range of physical cache addresses that are allocated for the second virtual cache 338 in the physical cache 340. The second virtual cache 338 permits accesses by the other client 332 (i.e., CLIENT 2) to slots in the physical cache allocated to the second virtual cache 338.

Figure 3B:
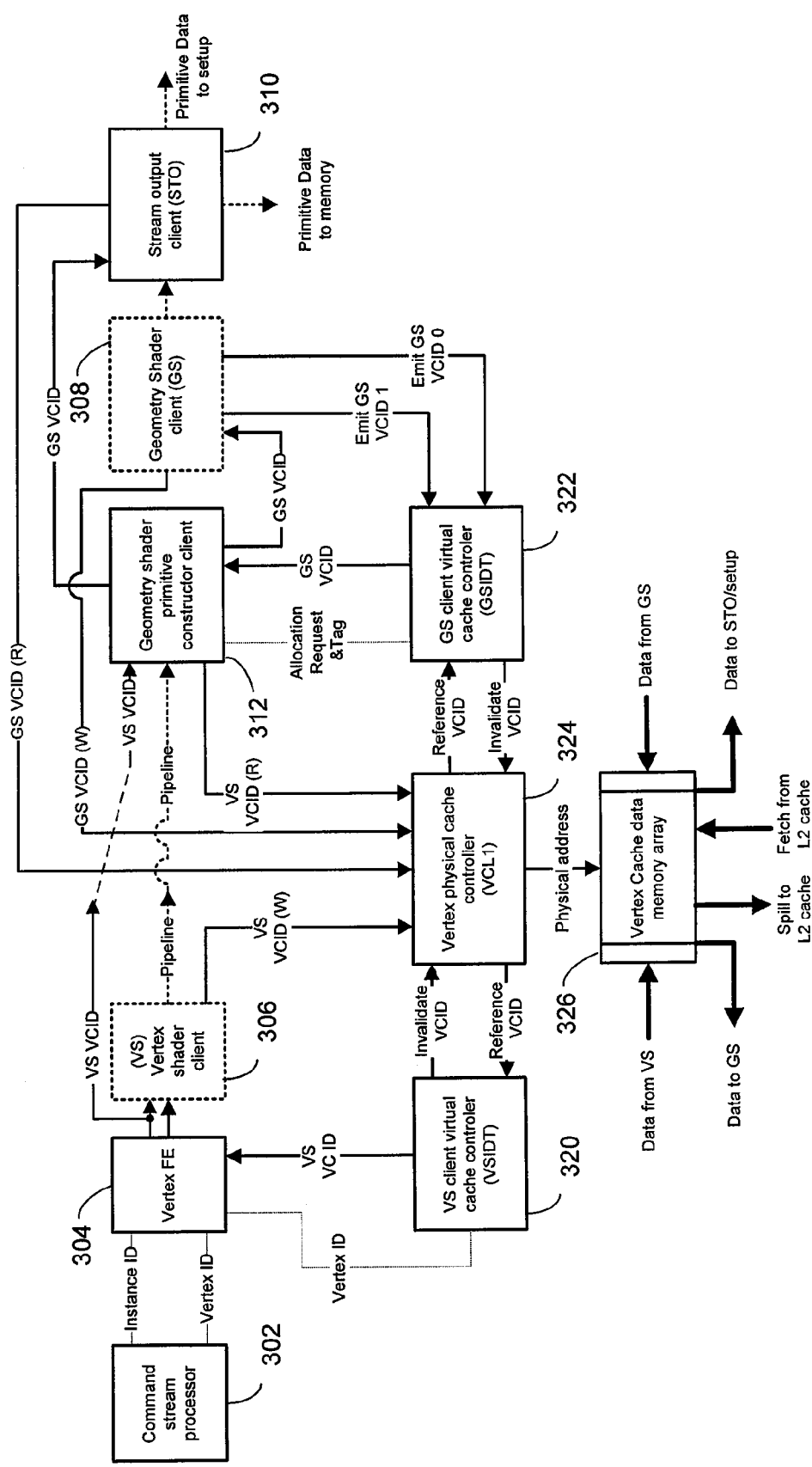
FIG. 3B shows a logical view of a graphics pipeline which incorporates an embodiment of the cache system.

Reference is now made to FIG. 3B, which shows a logical view of a graphics pipeline which incorporates an embodiment of the cache system. The logical view for the embodiment shown includes a command stream processor (CSP) 302, a Vertex Front End (Vertex FE) 304, a Vertex Shader (VS) Client 306, a Geometry Shader (GS) Primitive Constructor Client (GSPC) 312, a Geometry Shader Client 308, a Stream Output Client (STO) 310, and a cache subsystem. The cache subsystem includes a VS Client Virtual Cache Controller (VSIDT) 320, a GS Client Virtual Cache Controller (GSIDT) 322, a Vertex Physical Cache Controller (VCL1) 324 and a Vertex Cache Data memory array 326.

Generally, the VSIDT 320 performs the vertex hit/miss test and assigns a post-Vertex Shader Vertex Cache ID (VS VCID shown in FIG. 3B) to each incoming vertex specified by the VertexID and InstanceID from the CSP 302 through the VSFE 304. If a match is found in the hit/miss test, the associated VCID is assigned to the vertex and the reference count of VCID in the VS VCID table is incremented by 1, otherwise the next VCID slot in the VS VCID table will be assigned to the VertexID. After the hit/miss test is performed, the starting VCID assigned to the vertex is returned to the VSFE 304. The VSFE 304 will store the VCID in the task info entry and dispatch it to the execution unit (EU). The GSIDT 322 assigns post-Geometry Shader Vertex Cache ID (GS VCID) to each vertex in the geometry primitive that is about to be sent to the geometry shader. The starting virtual cache controller ID (VCID) assigned to the vertex is returned to the GS Task Constructor. The GSPC 312 will store the GS VCID in the task info entry and dispatch it to the EU.

The STO 310 provides an interface to output the post-geometry shader output from the pipeline. GS Task Constructor will send the GS task info to the STO 310, and the STO 310 will be triggered once a GS task is completed and begins stream the GS output to memory.

Figure 4:
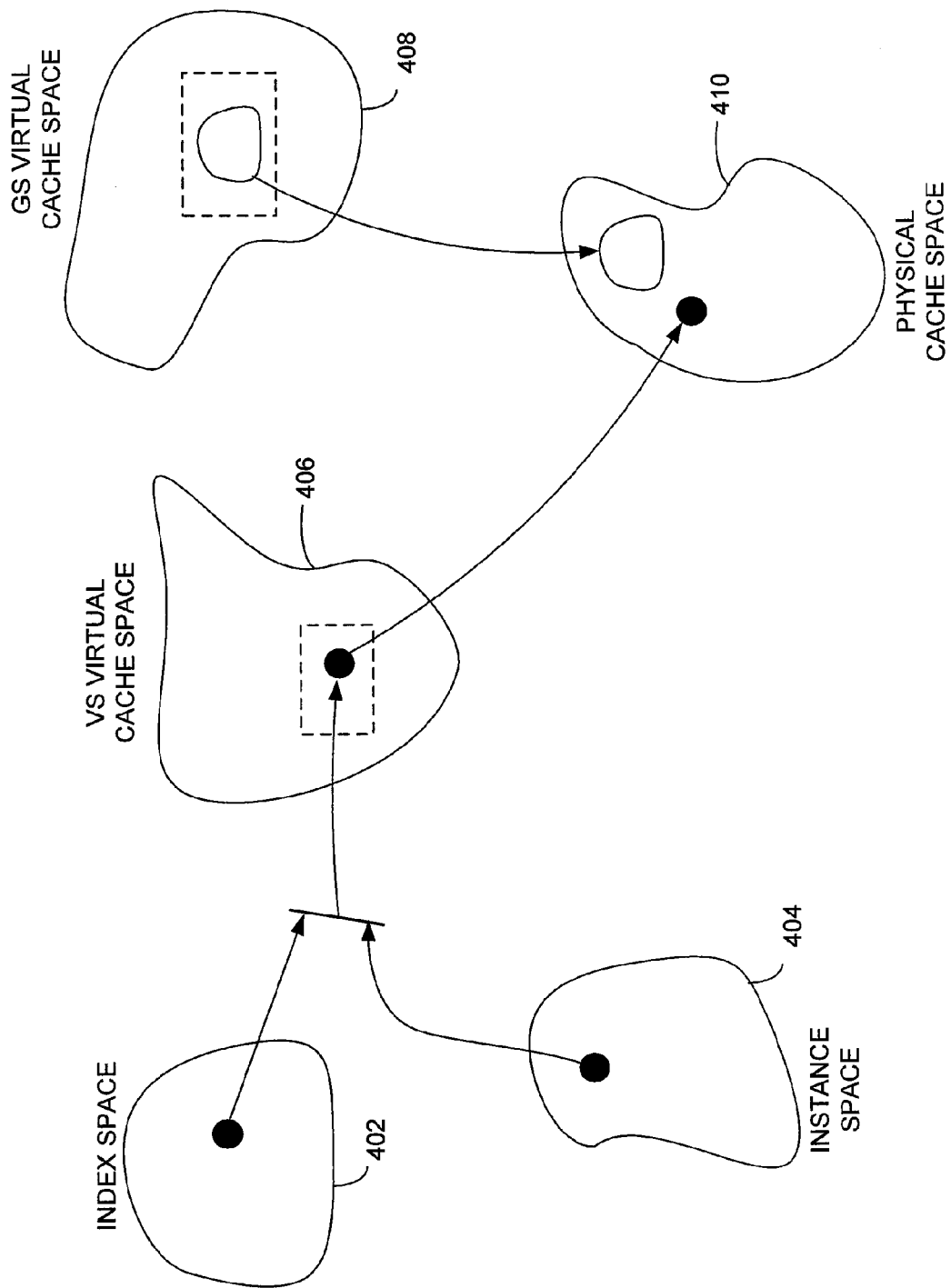
FIG. 4 shows a diagram of the various spaces employed by embodiments of the cache system.

FIG. 4 shows a conceptual view of the spaces involved in the pipeline activities. These spaces include a Vertex Index Space 402, an Instance Space 404, a VS Virtual Cache Space 406, a GS Virtual Cache Space 408, and a physical cache space 410. The Vertex Index Space 402 illustrates the set of all possible Vertex IDs and the Instance Space 404 illustrates the permissible instances for a Vertex ID. Vertex IDs with a given Instance are unique. The Vertex Index Space 402 is mapped to an allocated place in the VS Virtual Cache Space 406, which is mapped to an allocated place in the physical cache. One or more allocated places in the GS Virtual Cache Space 408 map to one or more allocated places in the physical cache 410. The VS unit operates in the VS Virtual Cache Space and the GS unit operates in the GS Virtual Cache Space, but these spaces share the use of the same physical cache VCL1.

A VCID in the VS 406 or GS 408 Virtual Cache is a data item that provides an address to the physical cache for reading, writing and invalidating entries. In one embodiment, if the physical cache is a set associative cache, the data item has two fields, a cache tag field and a cache index field. The index field provides the address to the sets and the tag field provides the remaining addresses for comparison with the physical cache tag RAM to select one of the sets. It should be noted that other cache arrangements are possible and still remain within the scope of the invention. For example, a direct-mapped or fully associative cache may be utilized for other embodiments.

With reference back to FIG. 3B, the Command Stream Processor (CSP) 302 presents an Instance ID and a Vertex ID to the Vertex Front End (VFE) 304. Together the Instance ID and the Vertex ID describe a unique vertex of a graphics primitive, such as a triangle or line segment. The VFE 304 then sends a request to the VS Virtual Cache Controller (VSIDT) 320 to allocate a VS VCID and return the VS VCID so that it may be used for accessing the physical cache VCL1 324. Before allocation, the VSIDT 320 executes a hit test and if the vertex with VCID is already allocated, the VS VCID is returned for this vertex. Otherwise, the VSIDT 320 allocates for a new vertex and returns VS VCID. The VS Unit (VS Shader Client) 306 can write data into the VCL1 324 via the VS VCID and the Geometry Shader Primitive Constructor Client (GSPC) 312 can read data from the VCL1 324 via the VS VCID obtained by the VFE 304.

The GSPC 312 can also request an allocation of a GS VCID from the GS Virtual Cache Controller 322 and receive an allocated GS VCID. Unlike the VS Virtual cache controller, the GS virtual cache controller includes hit testing capabilities because the GS client produces unique primitive data and always requires new allocations. The GS Unit (GS Shader Client) 308 can write the VCL1 via the GS VCID that was granted to the GSPC 312 and the STO 310 can read the VCL1 via the GS VCID that was granted to the GSPC 312.

The physical size of VCL1 is limited and is generally smaller than the combined virtual spaces allocated to both the VS and GS clients. This may cause potential deadlocks in the pipeline. Therefore, the physical space should generally be expanded to include the L2 cache such that data that will be used significantly later in time can be "spilled" over into the L2 cache. Furthermore, to avoid the VS/GS client from stalling due to latency from accesses to the L2 cache, the VLC1 control logic should be configured to perform advanced prefetching of the data back to the VCL1 cache.

In accordance with exemplary embodiments, the replacement policy in the VCL1 is based on a "greatest distance" policy. Generally, if a cache is full, an entry must be identified and removed from the cache in order to allow new entries to be stored in the cache. A replacement policy defines the rule for choosing the "best" entry to be "spilled" or removed to the L2 cache. An inappropriate choice regarding which entry to remove can adversely affect any improvement in performance that the cache may offer. For preferred embodiments, the greatest distance policy is defined such that the slot which is the "greatest distance" from being read by the next pipeline stage is selected for removal and written to either the L2 cache or to memory for later retrieval.

For some embodiments, the VCL1 contains a status table with two pieces of information and is used to implement the greatest distance replacement policy. The information includes the VCID valid bits and in-cache bits. The VCID valid bit indicates whether the vertex data associated with the given VCID has completed VS/GS execution and has arrived in the VCL1. The in-cache bit indicates whether the vertex data is actually present in the VCL1 rather than "spilled" over into the L2 cache or memory. Various embodiments monitor the status of client tasks based on their distance to an invalidation pointer in the virtual space of each client. Smaller distance values indicates that the data is about to be consumed or accessed. In these instances, data from the b2 cache is brought into VCL1. One should note that the opposite applies for write allocations. For write allocations, all tasks with the largest distance values is written directly to the L2 cache and later fetched for access in VCL1.

For some embodiments, the distance is calculated by subtracting the current invalidation pointer value of either the VSIDT or GSIDT from the given VCID value. The current invalidation pointer is an input signal to the VCL1 from the VSIDT or GSIDT and specifies where the read location is for the next pipeline stage. The VSID and GSID status table valid bits and in-cache bits are used to search for the valid and in-cache VSID and GSID with the greatest "distance" to the current VS/GS invalidation pointer. Given the current invalidation pointer at Ni and the current vertex at Nc, the distance can be calculated by the following expression:

$$N_c \geq N_i ? (N_c - N_i) : 512 + (N_c - N_i)$$

The operator ":" denotes modulo arithmetic generally known by those skilled in the art. It should thus be noted that the VSIDT/GSIDT table wraps around upon reaching the value 512. As a non-limiting example, if the VCID of the next VS vertex to invalidate is 0x07F and the current vertex received is 0x082, then the distance is calculated as 0x82−0x7F=3. The distances of VS and GS vertices are each calculated separately each with its respective pointers.

For the hardware implementation of the embodiments described above, determining the most significant distance vertex is performed by decoding bits 7 and 6 of a VSID or bits 9 through 6 of the GSID into a bit string, masking it with a mask generated by the invalidation pointer, and then searching for a leading one.

Figure 5:
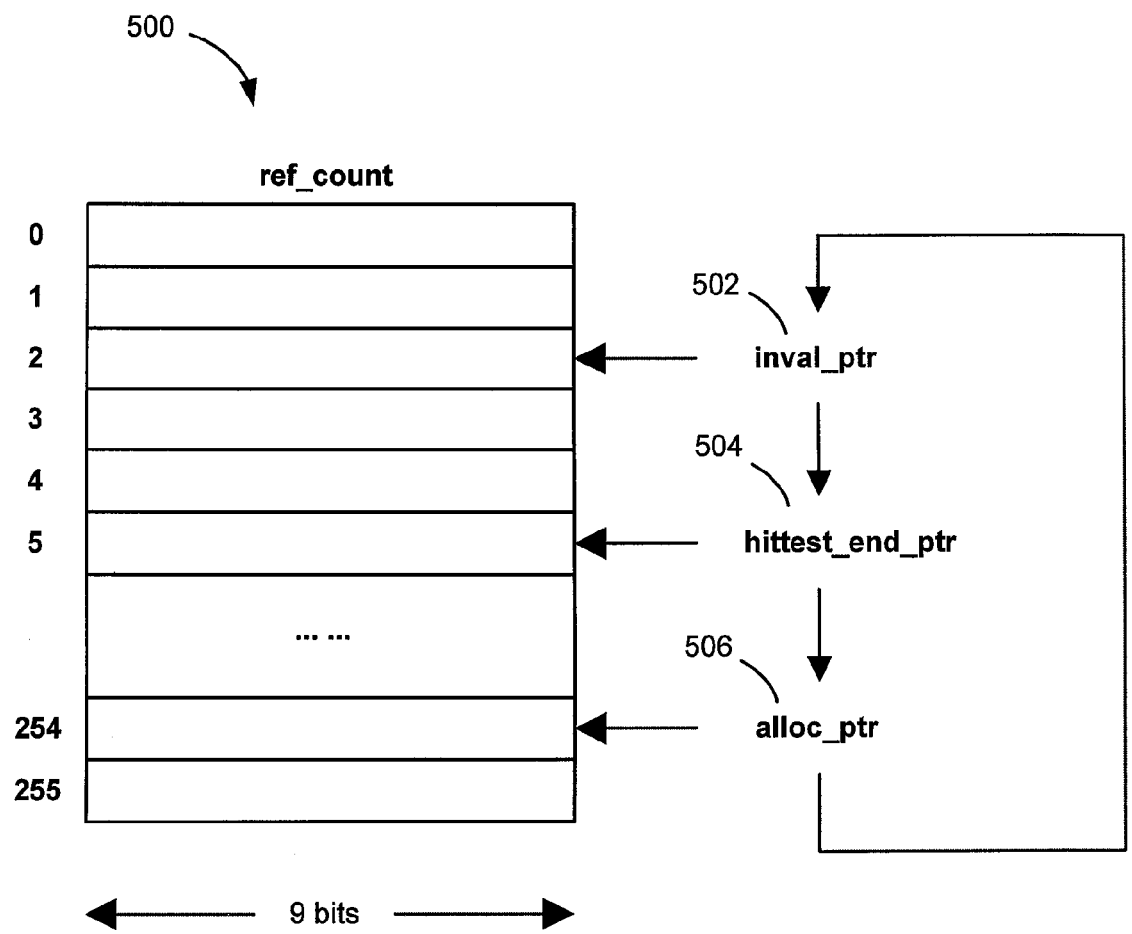
FIG. 5 shows the reference counters and pointers used in managing the VSIDT.

FIG. 5 shows the reference counters and pointers used in table management. The VS VCID table 500 is managed by a set of pointers, an Invalidate Pointer (inval_ptr) 502, a Hit Test End Pointer (hittest_end_ptr) 504, and an Allocation Pointer (alloc_ptr) 506. The Allocation Pointer 506 points to the next VCID to be allocated in the table 500. The Invalidation Pointer 502 points to the next VCID to be invalidated in the table 500. The Hit Test End Pointer 504 defines an active window between the Hit Test End Pointer 504 and the Allocation Pointer 506, as shown in FIG. 5. The active window is equal to the number of current, valid entries in the VS Tag RAM, and thus defines those entries in the VS VCID that are subject to a hit/miss test in the VS Tag RAM. The number of entries in VCL1 allocated for VS entries is equal to the number of entries between the Invalidate Pointer 502 and the Allocation Pointer 506. There can be many allocated entries between the Invalidate Pointer 502 and the Hit Test End Pointer 504 which are entries that are not available for a hit/miss test, because VCID numbers for them are not in the VS Tag RAM. For preferred embodiments, the three pointers are subject to the following conditions. The Allocation Pointer 506 cannot overtake the Invalidation pointer 502 and the Invalidation Pointer 502 cannot overtake the Hit Test End Pointer 504. The Allocation Pointer 506 is advanced when a new entry is allocated in VCL1. The Invalidation Pointer 502 is advanced when an entry is freed in the VCL1 in the case where zero references are left.

Figure 6:
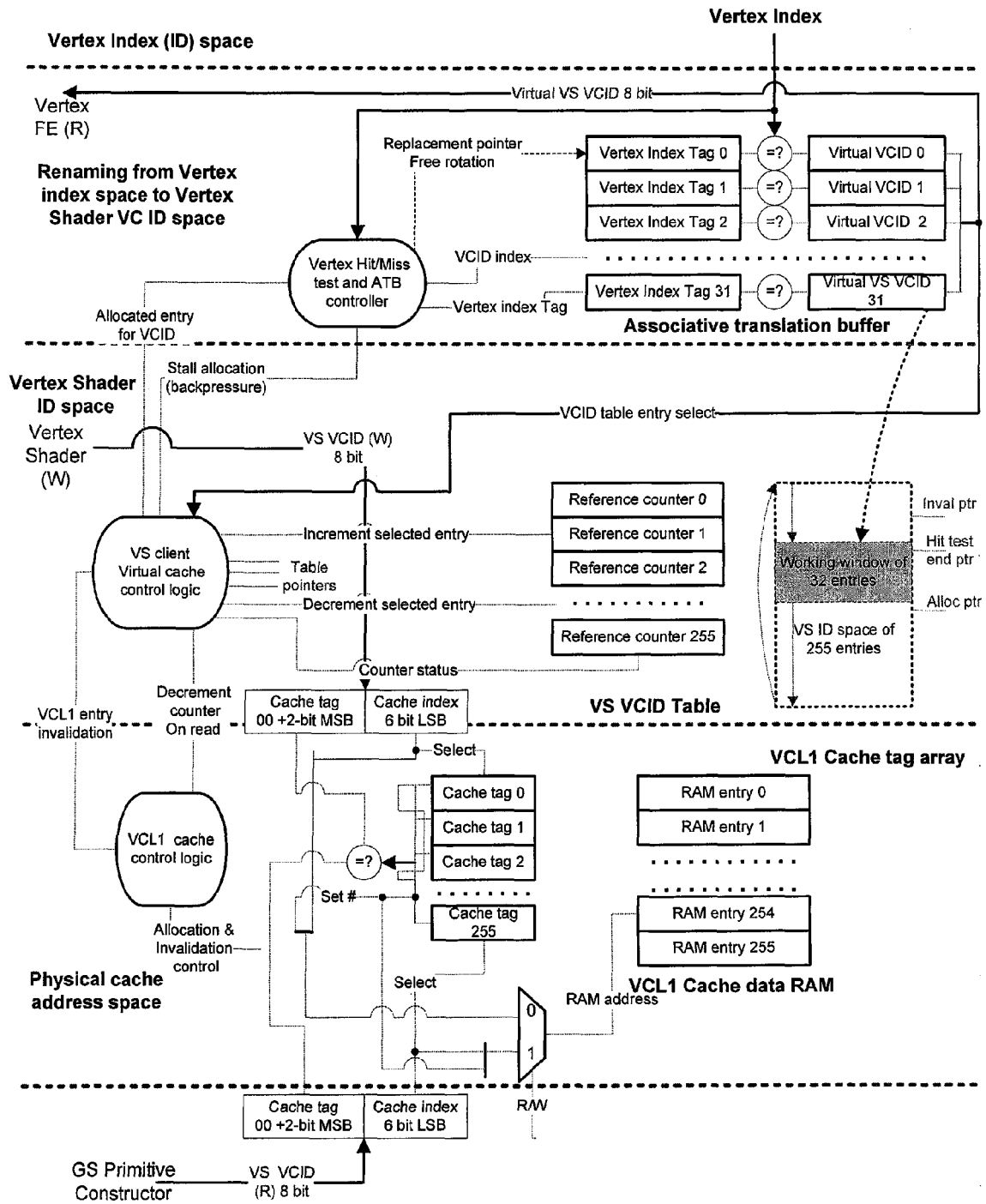
FIG. 6 shows a logical flow diagram of activities in the VS virtual cache controller.

FIG. 6 provides a logical flow diagram of the operations in the VS virtual cache controller. The flow begins with a Vertex Index that is received by the VS Tag RAM. The Vertex Tag RAM control determines whether or not the Vertex Index is associated with a valid VCID. If so, a hit has occurred and the Vertex Tag Ram returns a valid VCID entry number in the VS VCID table. The VCID is also used to access the reference count in the VS VCID table for adjustment, i.e., for incrementing or decrementing. The VCID is also used to access the VCL1 cache where actual vertex data is placed. If a miss occurs, indicating that there is no association with the Vertex Index, then the VS Tag RAM obtains a VCID from the VS VCID table, if one is available and associates it with the Vertex Index. If there is no slot available, then the VS Tag RAM stalls.

Figure 7:
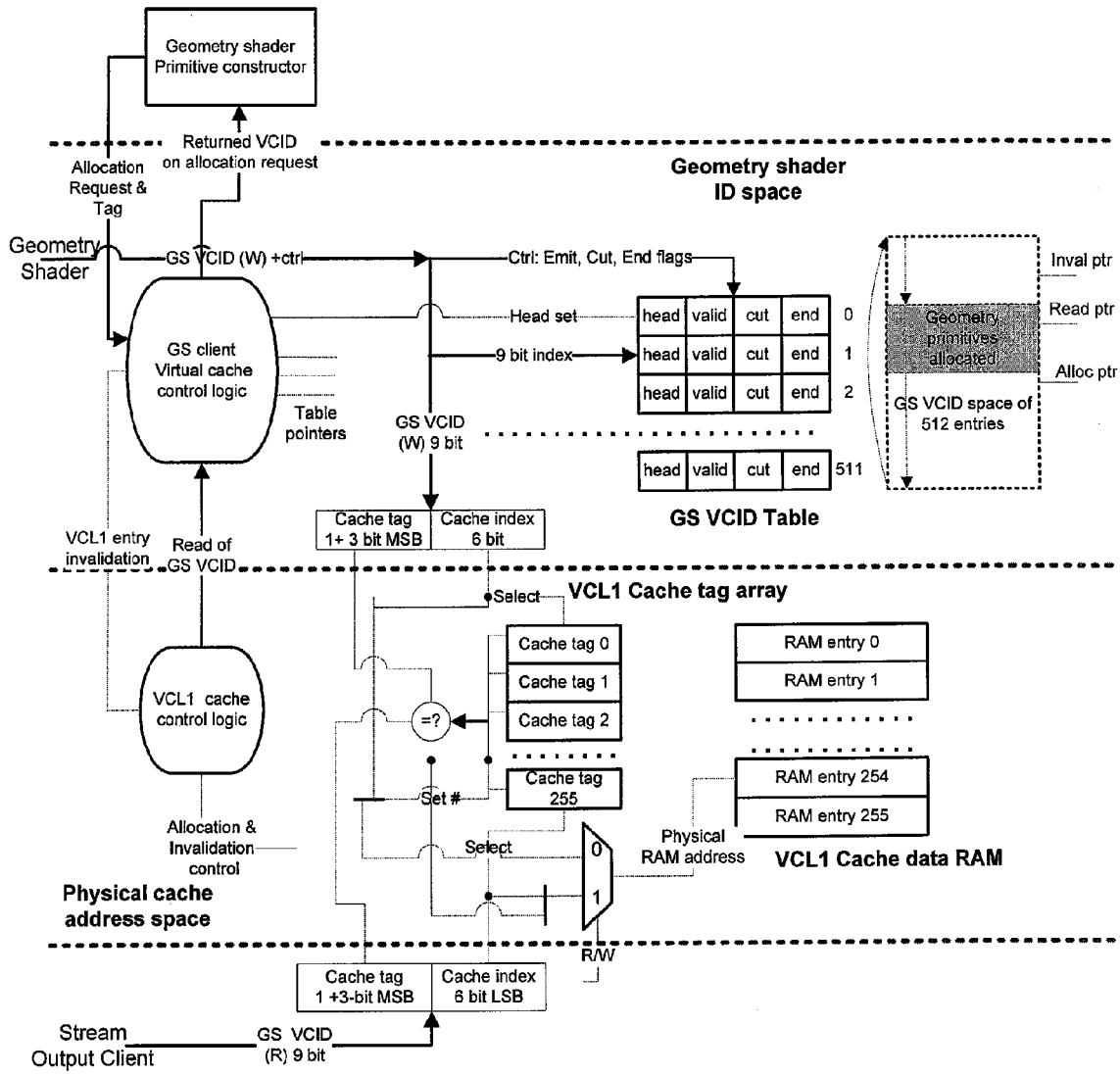
FIG. 7 shows a logical flow diagram of activities in the GS virtual cache controller.

FIG. 7 shows a logical flow diagram of the GS virtual cache controller. Three components of the pipeline interact with the GS VCID Table, (i) the GSPC, (ii) the GS, and the (iii) STO. The GSPC requests allocation of an entry in the VCL1 and thus an entry in the GS VCID table. During allocation, the virtual cache controller logic sets the head flag in the first allocated entry for the primitive. The GS receives the VCID allocated in the GS VCID table and performs write operations in the VCL1 using the granted GS VCID. At that time GS also sets the Emit, Cut and End flags if required. The STO also receives the allocated GS VCID and performs read operations on the VCL1 using the granted GS VCID. When the STO reads data, it clears end flag which indicates the data was consumed and the entry in GS VCID table and matching VCL1 entry can be invalidated.

In accordance with exemplary embodiments, the overall pipeline operation is now described. The CSP (Command Stream Process) generates or forwards a Vertex ID for each vertex received in input stream cache and sends it to Vertex FrontEnd unit, which makes a decision about further processing of each vertex in vertex shader client. In some primitive sequences, the same vertex data can be used several times and it may be the case that a particular vertex may already be allocated in the Vertex cache. It is important to note that a Vertex ID may arrive hundreds or more pipeline cycles before the VS client can write any data to the physical cache in an allocated location. Having the allocation and hit/miss logic for that vertex be completely virtual and decoupled from the physical cache memory allocation allows the time between the arrival of a Vertex ID and the writing of its associated data to be accommodated without early allocation of actual physical memory.

Vertex FE then sends Vertex ID to the VSIDT which checks allocations of the vertex with this ID. If such an ID was allocated, a hit has occurred and the VSIDT returns to the Vertex FE an allocated VS VCID and increments the reference counter associated with this VCID. If such an ID was not allocated, a miss has occurred and the VSIDT allocates a new entry in the VSIDT. When the allocation process is completed, the logic returns to the Vertex FE, the newly allocated VCID and increment the reference counter associated with the VCID. The Vertex FE forwards received VS VCID to the Vertex Shader client and Geometry Shader Primitive Constructor (GSPC), which further uses the VS VCID to access the vertex data in the VCL1. Several cycles later the Vertex Shader client writes the result of vertex shading (transformations) using this allocated VS VCID and GSPC uses this allocated address to read the vertex data when it constructs primitives for geometry processing.

The GSPC constructs primitives from vertices using the forwarded VS VCID references and makes an allocation request for output of the GS client processing results. It sends to the GSIDT a tag which defines required data or record size in terms of the number of cache lines and based on this tag, the GSIDT allocates space in the virtual cache and marks the "head" flag of the record in the appropriate virtual cache entry. The GSIDT then returns the GS VCID of the entry flagged as the "head" to the GSPC, which forwards it to the Geometry Shader client and Stream Output client. The GS client uses the GS VCID to write the primitive data which is generated during execution of the Geometry Shader. The Stream Output uses this GS VCID to read primitive data and send the data to memory and to a Geometry Setup unit in Rasterizer.

The Geometry Shader has two concurrent channels for emitting resulting primitives and the GSIDT receives an "emit" signal with an associated GS VCID to update the status of selected entry. Generally, GS primitive data is fundamentally different from vertex data. That is, GS primitive data has a single assignment and there are no multiple reads of this data. This why there are no reference counters in the GSIDT. There are only a number of status bits that describe the status of each entry in the GSIDT. Each primitive "stored" in the GSIDT can be read only once by the STO. After this read operation, the GS virtual cache slots allocated for this primitive can be invalidated. The VCL1 informs the GSIDT about the read operation by sending VCID to be invalidated.

The VCL1 functions as a slave to the virtual cache controllers and provides data read/write from the locations defined by the VS VCID and the GS VCID. Every time that data is read from the vertex cache memory that is allocated for the VS client, the VCL1 sends to the VSIDT the VCID of the read location. The VSIDT then uses the VCID to select the associated reference counter that should be decremented. When the reference counter in the location pointed to by the Invalidate pointer reaches zero, the VSIDT sends a request with the VCID to invalidate the VCL1 entry.

Figure 8:
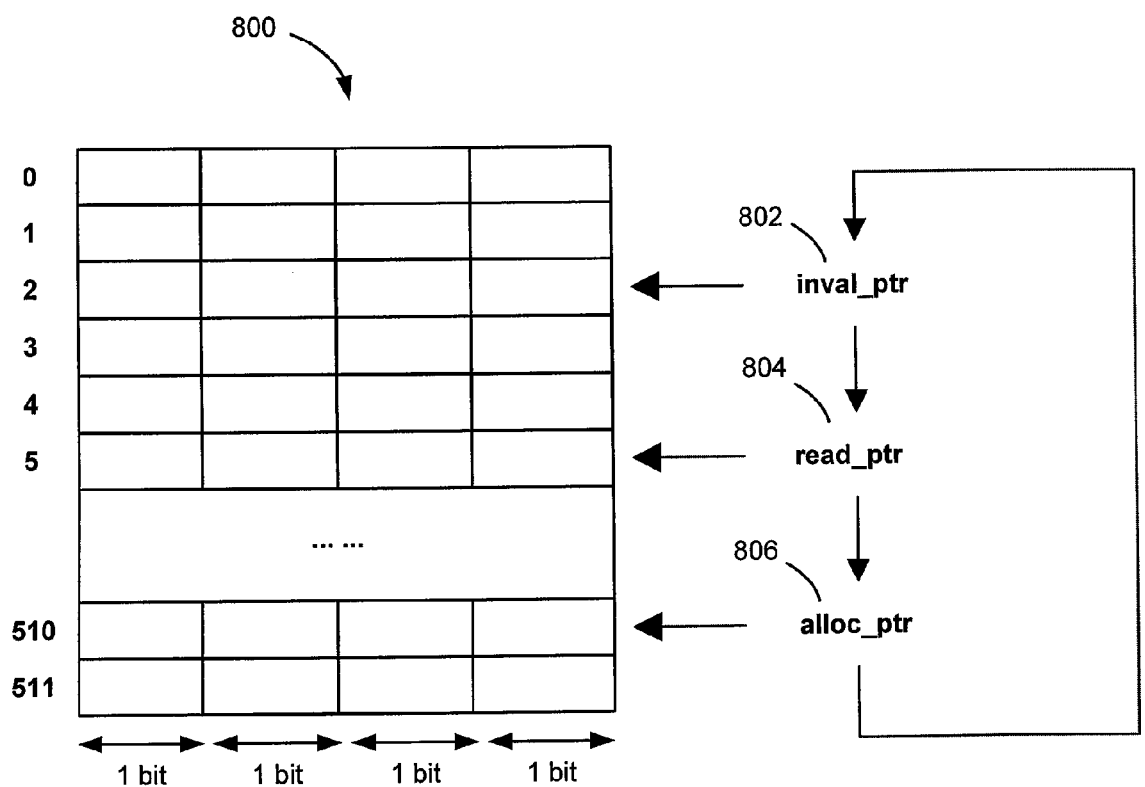
FIG. 8 shows the pointers and cache line status bits used in managing the GSIDT.

FIG. 8 shows the GS ID table with the pointers and flags that govern the operation of the GS Controller. The GS VCID table 800 is indexed by the GS VCID, which is also used to access the physical cache VCL1, and contains the "head," "valid," "cut," and "end" flags for each entry. The "head" flag marks the beginning of a multiple slot allocation. The "valid" flag marks a table entry as valid (i.e., allocated). The "cut" flag marks the end of a triangle or line strip. The "end" flag marks the last VCID that was read. For each allocated entry in the GS VCID table 800, there is an allocated entry in the VCL1.

As shown in FIG. 8, the GS VCID table 800 is also managed by its own set of pointers—the Invalidation Pointer (inval_ptr) 802, the Read pointer (read_ptr) 804, and the Allocation Pointer (alloc_ptr) 806. The Invalidation Pointer 802 points to the next entry to be invalidated. The Allocation Pointer 806 points to the next entry to be allocated. The Read Pointer 804 points to the next entry to be read. The Read pointer 804 cannot overtake the Allocation Pointer 806 and the Allocation Pointer 806 cannot overtake the Invalidation Pointer 802. Reading an entry advances the Read Pointer 804 and causes the "valid" and "cut" flags of a VCID to be cleared. The Read Pointer 804 may only move forward if the valid bits of the current and next location or both the valid and end bits of the current entry are marked.

An Invalidation operation on the GS VCID causes the entry to be marked invalid and the pointer to advance. Also, the "head" and "end" flags are cleared. The Invalidation Pointer 802 may move forward if the "valid" bit of the current GS VCID is cleared and there is no busy condition from the VCL1 for GS invalidation. Note that when the "end" bit is marked, the Invalidation Pointer 802 is moved to the starting location of the group of VCIDs from the next GS invocation by searching for the next GS VCID slot with the "head" bit set. All the VCIDs between the end of the last invocation and the start of the next invocation are skipped. Thus there is no need to send those GS VCIDs to the VCL1 for invalidation.

To allocate a block of GS VCIDs in the GS VCID Table, the current Allocation Pointer 806 is compared with the Invalidation Pointer 802. If the distance between the two pointers is greater than the size of the block to be allocated (represented by allocation tag), the block is allocated in the table and the starting VCID is returned to the requester (the GSPC in FIG. 10). After the block is allocated, the Allocation Pointer is advanced by the maximum GS output size and the "head" flag is marked at the head of the allocated block. If there is insufficient space to allocate the block, the allocation of GS VCIDs is stalled. Writing an entry in the VCL1 is performed after having allocated one or more entries in the GS VCID table and receiving the allocated VCID. In one embodiment, the size of the VSIDT is 512 entries, requiring nine bits to access the table.

Figure 9:
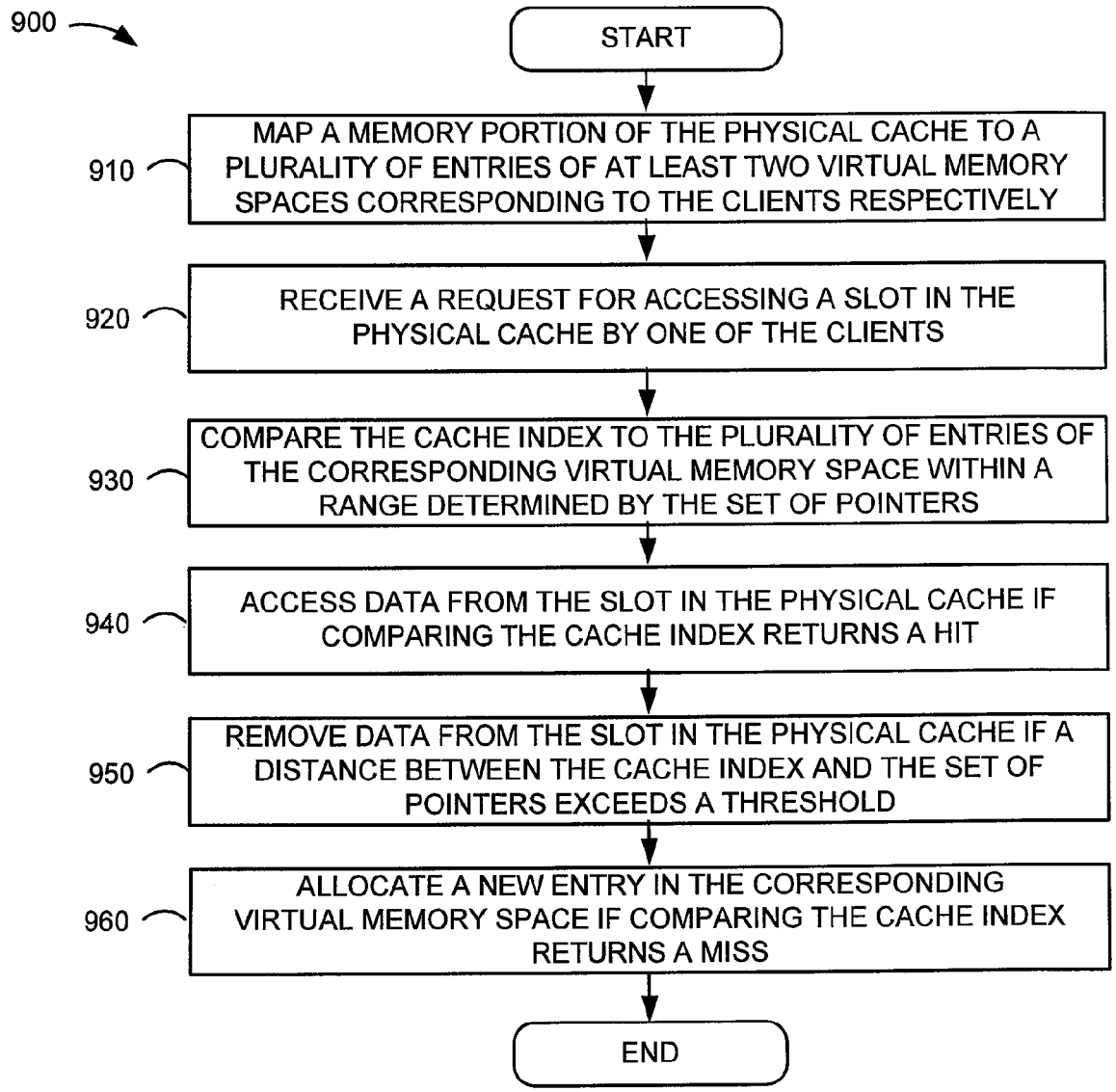
FIG. 9 shows a flow diagram for an embodiment of a method for sharing a physical cache among two or more clients.

Reference is now made to FIG. 9, which is a flow diagram for an embodiment of a method for sharing a physical cache among two or more clients. Block 910 begins by mapping a memory portion of the physical cache to a plurality of entries of at least two virtual memory spaces corresponding to the clients respectively. The plurality of entries is controlled by a set of pointers. In block 920, a request is received for accessing a slot in the physical cache by one of the clients. The request contains a cache index associated with the slot in the physical cache. In block 930, the cache index is compared to the plurality of entries of the corresponding virtual memory space within a range determined by the set of pointers. Data is then accessed from the slot in the physical cache if comparing the cache index returns a hit (block 940). Furthermore, data is removed from the slot in the physical cache if a distance between the cache index and the set of pointers exceeds a threshold when comparing the cache index to the plurality of entries (block 950). In accordance with some embodiments, a new entry is allocated in the corresponding virtual memory space if the step of comparing the cache index returns a miss (block 960).

Any process descriptions or blocks in flow charts should be understood as representing logic, segments, or portions of code which include one or more executable instructions for implementing specific logical functions, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Furthermore, it should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system for sharing caches between two or more clients in a stream data processing pipeline, the system comprising:
   a physical cache memory having a memory portion accessed through a cache index;
   a virtual cache space comprising N entries, the N entries comprising a continuous portion of M entries, the continuous portion mapped to the memory portion, where M and N are integer numbers and M is less than N, and the mapped continuous portion is shifted incrementally based on allocation of an entry to the virtual cache space;
   a vertex index space comprising M virtual valid tag entries, the M virtual valid tag entries mapped to the M entries of the continuous portion; and
   a virtual cache controller configured to provide the cache index for use by one of the clients based on performing a hit-miss test on the continuous portion in response to a vertex index received at the vertex index space.

2. The system as recited in claim 1, wherein the virtual cache controller allocates a new entry within the virtual cache space if the hit-miss test returns a miss.

3. The system as recited in claim 1, wherein the physical cache memory further comprises a status table including:
   a valid bit indicating whether the data associated with the cache index has completed execution; and
   an in-cache bit indicating whether the data associated with the cache index is present in the physical cache memory.

4. The system as recited in claim 1, wherein the continuous portion is smaller than the memory portion and is managed by a pair of pointers indicating the current valid entries.

5. The system as recited in claim 4, wherein the virtual cache space further comprises a third pointer configured to point to the next entry to be invalidated.

6. The system as recited in claim 1, wherein each entry of the virtual cache space comprises information bits configured to indicate an accessing status of data associated with the entry.

7. The system as recited in claim 1, wherein the one of the clients comprises a vertex shader and another of the clients comprises a geometry shader.

8. The system as recited in claim 1, wherein the virtual cache controller performs the hit-miss test by matching the cache index with every entry within the continuous portion.

9. A method for accessing a physical cache by two or more clients, the method comprising:
   mapping M virtual valid tag entries of a vertex index space to M entries of a continuous portion of a virtual cache space, the virtual cache space comprising N entries, the N entries comprising a subset of the M entries that correspond to the continuous portion, where M and N are integer numbers and M is less than N;
   mapping the continuous portion to a memory portion of the physical cache;
   receiving at the vertex index space a vertex index;
   performing by a virtual cache controller a hit-miss test on the continuous portion based on the vertex index;
   providing by the virtual cache controller a cache index based on the hit-miss test; and
   shifting incrementally the mapped continuous portion based on allocation of an entry to the virtual cache space.

10. The method as recited in claim 9, wherein providing comprises allocating a new entry in the virtual cache space if the hit-miss test returns a miss.

11. The method as recited in claim 9, wherein performing comprises comparing the vertex index to an invalidation pointer configured to point to the next entry to be invalidated in the virtual cache space.

12. The method as recited in claim 9 further comprising updating status bits of the entry of the virtual cache space.

13. The method as recited in claim 9, wherein the mapping further comprises mapping each entry of the memory portion to a status table, the status table including information of data validation and presence of the entry.

14. A graphic processing system, comprising:
a physical cache having a plurality of slots for storing data; and
a cache controller configured to allocate memory space within the physical cache, wherein the memory space is determined by a set of pointers that define a continuous portion of M entries in virtual cache space, the virtual cache space comprising N entries that include the M entries, where M and N are integer numbers and M is less than N, the M entries of the continuous portion mapped from M virtual valid tag entries in a vertex index space, the continuous portion subject to a hit-miss test, wherein the mapped continuous portion is shifted incrementally based on allocation of an entry to the virtual cache space.

15. The graphics processing system as recited in claim 14, further comprising a status table that contains a current pointer and an in-cache indicator, wherein the in-cache indicator indicates whether data to be accessed is already present within the physical cache, and wherein the status table is used to track a distance of each slot of the physical cache.

16. The graphics processing system as recited in claim 15, wherein the slot with the greatest distance from being read is removed and written to an L2 cache or other memory device prior to other valid entries.

17. The graphics processing system as recited in claim 15, wherein the distance is calculated by calculating the difference between a current invalidation pointer and the current pointer, wherein the invalidation pointer specifies a read location for the next pipeline stage for each of the clients.

18. The graphics processing system as recited in claim 14, wherein the physical cache is shared by pipeline stages within the graphics processing system, and wherein the plurality of clients have different cache access patterns.

19. The graphics processing system as recited in claim 14, wherein the plurality of clients comprises a vertex shader and a geometry shader.

* * * * *